United States Patent [19]

Eckardt

[11] 4,376,625

[45] Mar. 15, 1983

[54] INJECTION-MOLDING APPARATUS FOR MAKING OBJECTS OF TWO DIFFERENT RESINS

[75] Inventor: Helmut Eckardt, Hilchenbach, Fed. Rep. of Germany

[73] Assignee: Battenfeld Maschinenfabrik GmbH, Meinerzhagen, Fed. Rep. of Germany

[21] Appl. No.: 278,429

[22] Filed: Jun. 29, 1981

[30] Foreign Application Priority Data

Jul. 5, 1980 [DE] Fed. Rep. of Germany ....... 3025597

[51] Int. Cl.³ .............................................. B29F 1/03
[52] U.S. Cl. .................................... 425/564; 425/132
[58] Field of Search ................................ 425/564, 132

[56] References Cited

U.S. PATENT DOCUMENTS

| | | | |
|---|---|---|---|
| 3,921,856 | 11/1975 | Langecker | 222/132 |
| 4,078,875 | 3/1978 | Eckardt | 425/564 X |
| 4,117,955 | 10/1978 | Sokolow | 222/144.5 |

FOREIGN PATENT DOCUMENTS

| | | |
|---|---|---|
| 2342789 | 3/1975 | Fed. Rep. of Germany . |
| 2342794 | 3/1975 | Fed. Rep. of Germany . |
| 2346135 | 4/1975 | Fed. Rep. of Germany . |
| 2259818 | 6/1975 | Fed. Rep. of Germany . |
| 2449758 | 4/1976 | Fed. Rep. of Germany . |
| 2800482 | 6/1978 | Fed. Rep. of Germany . |

*Primary Examiner*—Thomas P. Pavelko
*Attorney, Agent, or Firm*—Karl F. Ross; Herbert Dubno

[57] ABSTRACT

An injection-molding apparatus has a nozzle extending along an axis and formed with an axially forwardly opening outlet, an annular port fixed immediately axially behind or upstream of the outlet, and a central axially forwardly opening port axially fixed behind the annular outlet. Respective plastifiers for feeding respective plastified synthetic resins, normally thermoplastics, are connected to the respective ports. An axially displaceable valve body in the nozzle is displaceable from a fully forward position blocking both of the ports, through a partially back position blocking only the central port, to a fully back position clear of both of the ports. Thus in the fully forward position no resin can enter the nozzle, in the partially back position resin can enter the nozzle only from the annular port, and in the fully back position resins can enter the nozzle through both of the ports.

11 Claims, 3 Drawing Figures

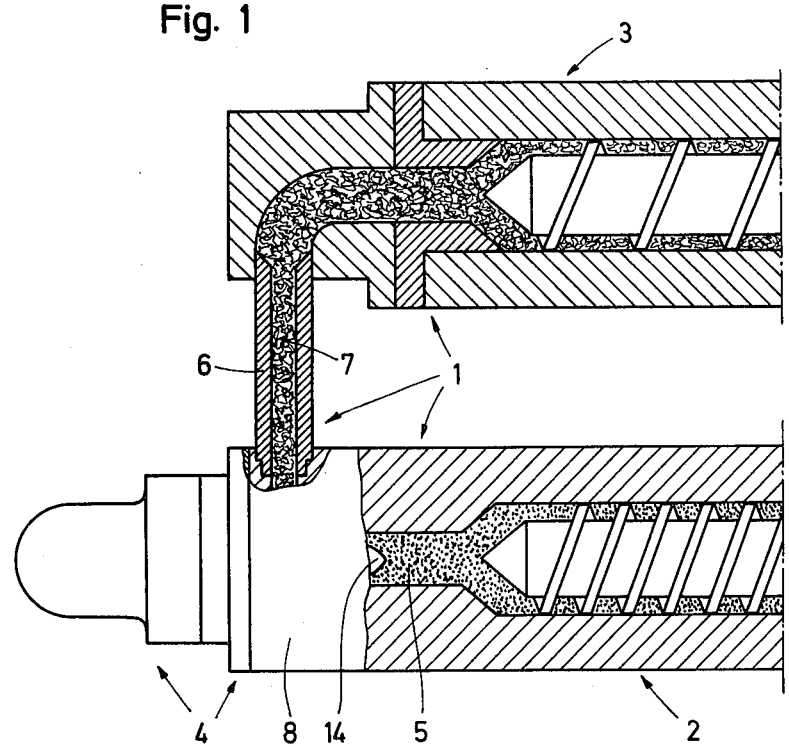

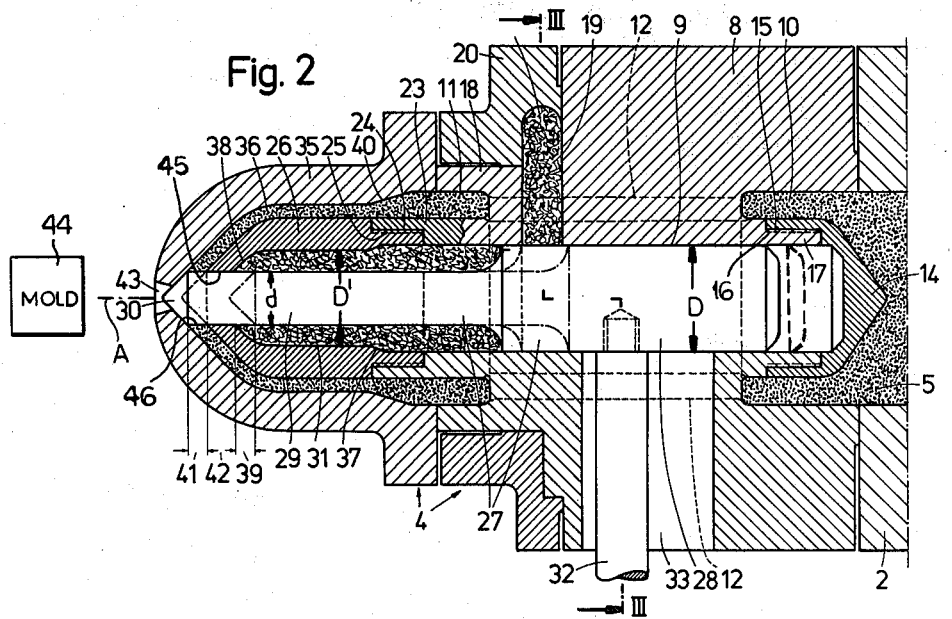

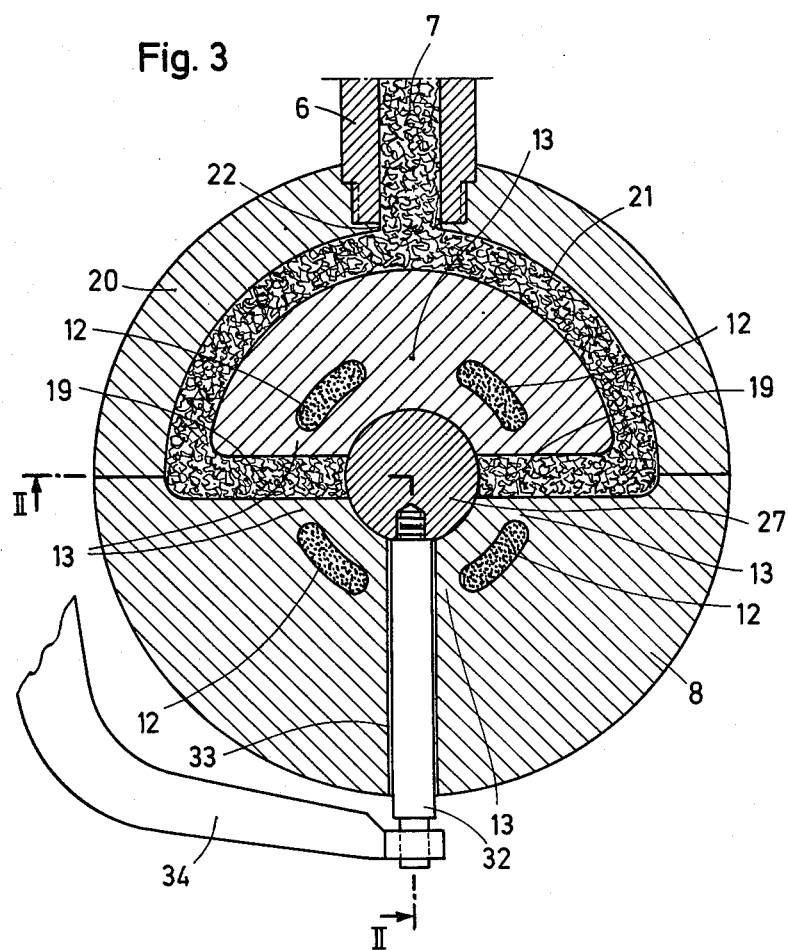

INJECTION-MOLDING APPARATUS FOR MAKING OBJECTS OF TWO DIFFERENT RESINS

FIELD OF THE INVENTION

The present invention relates to an injection-molding apparatus for making objects of two different resins. More particularly this invention concerns an injector nozzle for making synthetic-resin objects having a foamed core and a dense skin.

BACKGROUND OF THE INVENTION

In order to make an object having a foamed core and a dense skin which may be of a different resin from the core, it is necessary to use a nozzle having a pair of ports. The port from which the skin-forming denser resin is extruded is annular and surrounds a central port from which the core-forming resin having the blowing agent is extruded. Thus the foaming resin is extruded inside a sheath of the skin-forming resin.

The standard such machine, as described in German patent publication Nos. 2,259,818; 2,342,789; 2,342,794; 2,346,135; and 2,449,758 (U.S. equivalent patent 4,078,875), has a central nozzle part that can move axially relative to an outer nozzle part. The central nozzle part is formed at the axis with the central port for the core resin and the outer nozzle part defines with the central nozzle part an annular gap that constitutes the annular nozzle port from which the skin resin is extruded. The size of the annular nozzle port can be controlled, and in fact the annular nozzle can be completely closed by axially displacing the central nozzle part relative to the outer nozzle part. A standard blocking needle is in turn axially displaceable in the central nozzle part to open and close this port.

Such an arrangement therefore requires the use of separate actuators for opening and controlling the two nozzle ports. In addition the structure forming this nozzle must be formed with a complex arrangement of flow passages for the various resins. It takes a great deal of machining to produce these passages so that such nozzles are quite expensive.

OBJECTS OF THE INVENTION

It is therefore an object of the present invention to provide an improved injection-molding apparatus for making objects of two different resins.

Another object is the provision of a nozzle for such an apparatus which can be made at low cost and which is substantially simpler than the prior-art nozzles.

SUMMARY OF THE INVENTION

These objects are attained according to the instant invention in an injection-molding apparatus having a nozzle extending along an axis and formed with an axially forwardly opening outlet, an annular port fixed immediately axially behind or upstream of the outlet, and a central axially forwardly opening port axially fixed behind the annular outlet. Respectively plastifying means for feeding respective plastified synthetic resins, normally thermoplastics, are connected to the respective ports. An axially displaceable valve body in the nozzle is displaceable from a fully forward position blocking both of the ports, through a partially back position blocking only the central port, to a fully back position clear of both of the ports. Thus in the fully forward position no resin can enter the nozzle, in the partially back position resin can enter the nozzle only from the annular port, and in the fully back position resins can enter the nozzle through both of the ports.

The arrangement according to the instant invention therefore is quite simple. Only a single valve body is needed to control flow from the two-resin nozzle, and simple displacement of this valve body between its end positions will automatically open and close the various ports of the valve. As a result the structure can be produced at low cost, and can be operated with relative ease, as only the single valve body need be displaced to control flow out of the nozzle.

According to another feature of this invention, the nozzle has a large-diameter axially centered bore terminating axially forwardly at the central port. The needle has a large-diameter rear portion snugly received and slidable in the bore and a small-diameter front portion engageable snugly through the central port with the outlet. The small front portion blocks the outlet in the fully forward position. In this manner the valve body is guided extremely accurately.

In accordance with another feature of this invention the nozzle is formed with at least one radially extending passage opening into the large-diameter bore axially behind the central port and connected to one of the means to receive the respective resin. The portions of the body are so dimensioned that when the small-diameter portion is in the fully forward position and the partially back position, the large-diameter portion blocks the radial passage. Thus this valve body effectively stops flow through the valve for the core resin at two locations, ensuring no leakage between molding operations.

In the apparatus according to this invention the nozzle is formed with at least one axially extending passage angularly offset from the radially extending passage and extending from the annular port to the respective plastifying means. The plastifying means of the annular port is a screw-type extruder coaxial with the nozzle and the other plastifying means is another screw-type extruder laterally offset from the nozzle.

The nozzle itself is formed with at least one arcuate passage of small radius of curvature connected between the radial passage and the other extruder. This arcuate passage extends over at least 180° relative to the axis and the nozzle has a diameter relativel to the axis which is more than twice as great as the radius of curvature of the arcuate passage. More particularly, according to this invention, the nozzle is formed with a plurality of such axially extending passages angularly generally equispaced about the axis. The nozzle is formed of a base plate formed with the bore, the ports, the outlet, the axial passage and the radial passage, and of a ring forming with the base plate the arcuate passage.

According to yet another feature of this invention, the base plate has an axially centered and forwardly extending annular projection and an axially centered front cap forming the bore and formed with the central port. The nozzle itself comprises an outer nozzle cap internally complementary with the front cap, forming therewith the annular port, and formed with the outlet. The outer nozzle cap is secured to the forwardly extending projection. The base plate of the system of this invention has an axially centered and rearwardly extending annular projection provided with an axially centered rear cap internally forming the bore.

According to yet another feature of this invention the valve body is provided with an arm extending radially out of the nozzle. The apparatus further comprises means connected to the arm for displacing the body between the positions. This arm extends out of the nozzle through an axially elongated and radially open slot formed in the nozzle.

DESCRIPTION OF THE DRAWING

The above and other objects, features, and advantages will become more readily apparent from the following, reference being made to the accompanying drawing in which:

FIG. 1 is a side view partly in axial section through an injection-molding extruder according to this invention;

FIG. 2 is a large-scale cross-section through the apparatus of FIG. 1; and

FIG. 3 is a section taken along line III—III of FIG. 2, the line II—II in FIG. 3 showing the section plane of FIG. 2.

SPECIFIC DESCRIPTION

As seen in FIG. 1 an injection-molding machine according to the instant invention has two standard screw-type extruders 2 and 3 connected together at a nozzle 4 and feeding thereto respective plastified resins 5 and 7, e.g. polyvinyls or polyethylenes. Normally the resins are compatible but the core resin 7 has an expanding or blowing agent. The extruder 3 is laterally offset from the nozzle 4 and connected via a tube 6 to a base plate 8 of the nozzle 4 and the extruder 2 is axially aligned with the nozzle 4.

FIGS. 2 and 3 show in more detail how the base plate 8 is formed with a cylindrical central passage 9 of relatively large diameter D and defining the nozzle axis A. Backwardly and forwardly open rear and front annular grooves 10 and 11 are formed in the base plate 8 around the ends of the bore 9 to define tubular rear and front projections 17 and 23, respectively. Four angularly equispaced passages 12 connect the front end of the rear groove 10 with the rear end of the front groove 11 so that the resin 5 can flow axially forwardly from the back to the front around the bore 9. These passages 12 leave webs 13 in the steel of the plate 8 that are sufficient to make the entire structure very rigid. The rear tubular projection 17 is formed with external threads 16 that fit with internal threads 15 of a rearwardly pointed and axially centered cap 14. Similarly the front tubular extension 23 is formed with internal threads 24 fitting with external threads 25 of a front end cap 26 that is similarly axially centered and that is formed at the axis A with a cylindrical bore or port 45 of diameter d.

The plate 8 is unitarily formed with a forward extension 18 defining radially extending passages 19 that extend through the four angularly equispaced webs 13 and open inwardly into the bore 9. A ring 20 fixed on the plate 8 forms with the plate 8 arcuate passages 21 connecting the radial outer ends of the passages 19 with a radially outwardly opening passage 22 connected to the tube 6. Thus the resin 7 coming from the extruder 3 can flow into the bore 9.

A valve body or needle 27 provided in the bore 9 has a large-diameter rear portion 28 of the same diameter D as the bore 9 and a front portion 29 of substantially smaller diameter d. When in a partially back position illustrated in dashed lines, the valve needle 27 blocks the inner ends of the passages 19 and prevents the mass 7 from entering the bore 9. The valve needle 27 is carried on a radially extending arm 32 projecting out of the plate 8 through an axially elongated slot 33 therein and connected to an operating arm 34 that serves to move the needle 27 between the fully back dot-dash position through the partially back dashed-line position to the fully forward solid-line position.

An outer nozzle part 35 fixed to the extension 18 defines with the complementarily shaped cap 26 an axially centered cup-shaped passage 36 which is an axially forward extension of the front annular groove 11. This cup-shaped passage 36 is reduced in flow cross section by a tapering shoulder 40. Thus the resin 5 coming from the extruder 2 can flow into the chamber 36. At the axis A the nozzle part 35 is formed with a forwardly flared outlet mouth 43 that is connected to a mold 44.

The cap 26 forms with the small-diameter extension 29 an axially centered annular chamber 31 that can communicate with the passages 19 in the dot-dash fully back position and that can be opened up axially forwardly in this fully back position through the port 45. The front inner wall 38 of the cup 36 is tapered axially forwardly in the same manner as the inner wall of the nozzle part 35 and outer wall of the cap 26. The inner wall of the cap 26 is formed with an axially forwardly tapering shoulder 37 serving like the shoulder 40 to compact the resin as it moves axially forwardly. Thus the two caps 26 and 35 define an annular and forwardly open port 46 that is centered on the axis A and spaced forward of the central port 45.

In use the two extruders 2 and 3 are normally operated to feed the respective resins 5 and 7 to the passages 19 and 36. The needle 27 starts out in the fully forward solid-line position in which its tip 30 completely blocks the outlet mouth 43 and its small-diameter portion 29 blocks the ports 45 and 46.

The needle 27 is then drawn back through a distance 41 so that the outer surface of the tip 30 forms a smooth continuation of the outer surface of the cap 26. This action clears the port 46 as well as the hole or mouth 43 so that the resin 5 can flow from the extruder 2 through the passages 12 and 36 and then out through the port 46 and then through the mouth 43. The resin 5 is normally one that is quite compact so that it will form an outer skin on the object formed in the mold 44.

Thereafter the needle 27 is again retracted through a distance 42 equal to the axial length of the port 45 and then through a distance 39 so as also to clear the opening 45 and simultaneously unblock the inner ends of the passages 19. The resin 7 can therefore flow through the passages 19 and 31 and out through the port 45. This resin, which contains an expanding or blowing agent so that it will form a cellular structure, will therefore be surrounded by the denser resin 5.

When sufficient resin has been injected into the mold 44 the needle is moved back forward. This action first cuts off the supply of the resin 5 by blocking the port 45, then of the resin 7 by blocking the port 46, so that the extruded mass of resin 5 will be completely surrounded by the denser resin 7.

It is also possible to control flow by starting and stopping the extruders 2 and 3, that is by pressurizing and depressurizing the resins 5 and 7.

Thus with the system according to the instant invention it is possible with a single valve needle to control the functions of a complex mixing nozzle as well as any of the prior-art structures with substantially more complex valving. Furthermore the system according to this invention can be produced at very low cost. All of the parts except the plate 8 and flange 20 can be lathed, and the boring and milling operations necessary for these parts are minor. The arcuate passages 21, for instance, are of minimal radius of curvature, so that they can easily be cut into the back of the piece 20. The inventive apparatus can therefore be made inexpensively.

I claim:

1. An injection-molding apparatus for forming objects of two different resins, said apparatus comprising:

a nozzle extending along an axis and having a tubular and axially centered outer nozzle part forming an axially forwardly opening outlet and a tubular and axially centered inner nozzle part fixed axially behind said outer part and forming therewith an annular port immediately axially behind said outlet and formed with a central axially forwardly opening port axially fixed behind and surrounded by said annular port;

respective plastifying means for feeding respective and different plastified synthetic resins under pressure to said ports; and an axially displaceable valve needle in said nozzle and snugly fittable in said central port, said needle being displaceable relative to both of said nozzle parts from a fully forward position extending axially forward through said central port past said inner nozzle part into engagement with said outer nozzle part at said outlet and blocking both of said ports, through a partially back position in and blocking only said central port, to a fully back position clear of both of said ports, whereby in said fully forward position no resin can enter said nozzle, in said partially back position resin can enter said nozzle only from said annular port, and in said fully back position resins can enter said nozzle through both of said ports.

2. The apparatus defined in claim 1 wherein said valve body is provided with an arm extending radially out of said nozzle, said apparatus further comprising means connected to said arm for displacing said needle between said positions.

3. The apparatus defined in claim 1 wherein said nozzle has a large-diameter axially centered bore terminating axially forwardly at said central port, said needle having a large-diameter rear portion snugly received and slidable in said bore and a small-diameter front portion engageable snugly through said central port with said outlet, said small front portion blocking said outlet in said fully forward position.

4. The apparatus defined in claim 3 wherein said nozzle is formed with at least one radially extending passage opening into said large diameter bore axially behind said central port and connected to one of said means to receive the respective resin, said portions of said needle being so dimensioned that when said small-diameter portion is in said fully forward position and said partially back position, said large-diameter portion blocks said radial passage.

5. The apparatus defined in claim 4 wherein said nozzle is formed with at least one axially extending passage angularly offset from said radially extending passage and extending from said annular port to the respective plastifying means.

6. The apparatus defined in claim 5 wherein the plastifying means of said annular port is a screw-type extruder coaxial with said nozzle and the other plastifying means is another screw-type extruder laterally offset from said nozzle, said nozzle being formed with at least one arcuate passage of small radius of curvature connected between said radial passage and said other extruder.

7. The apparatus defined in claim 6 wherein said arcuate passage extends over at least 180° relative to said axis and said nozzle has a diameter relative to said axis which is more than twice as great as said radius of curvature of said arcuate passage.

8. The apparatus defined in claim 7 wherein said nozzle is formed with a plurality of such axially extending passages angularly generally equispaced about said axis.

9. The apparatus defined in claim 8 wherein said nozzle is formed of a base plate formed with said bore, said ports, said outlet, said axial passage and said radial passage, and of a ring forming with said base plate said arcuate passage.

10. The apparatus defined in claim 9 wherein said base plate has an axially centered and forwardly extending annular projection, said inner nozzle part forming said bore and formed with said central port, said outer nozzle part internally complementary with said inner nozzle part, forming therwith said annular port, and formed with said outlet, said outer nozzle part being secured to said forwardly extending projection.

11. The apparatus defined in claim 10 wherein said base plate has an axially centered and rearwardly extending annular projection provided with an axially centered rear cap internally forming said bore.

* * * * *